July 10, 1923.
W. P. BULLARD
NUT GRADER
Filed Feb. 27, 1922
1,461,264
3 Sheets-Sheet 3
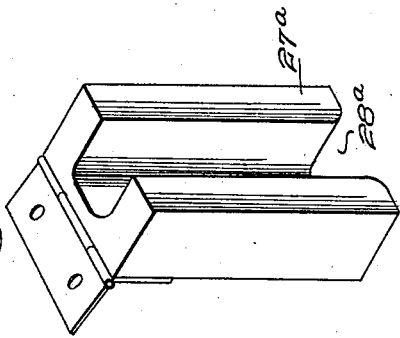
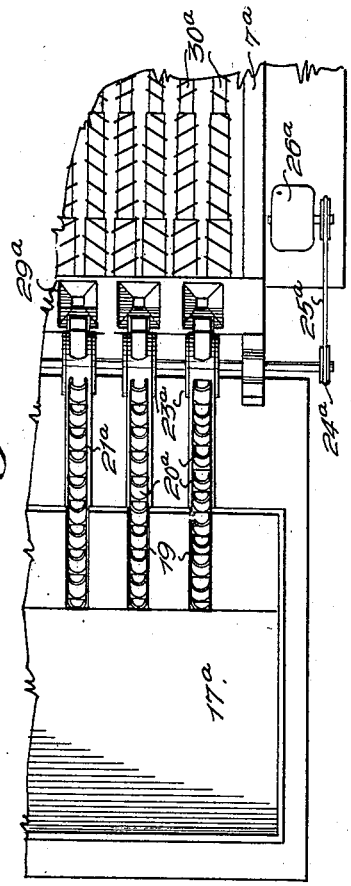
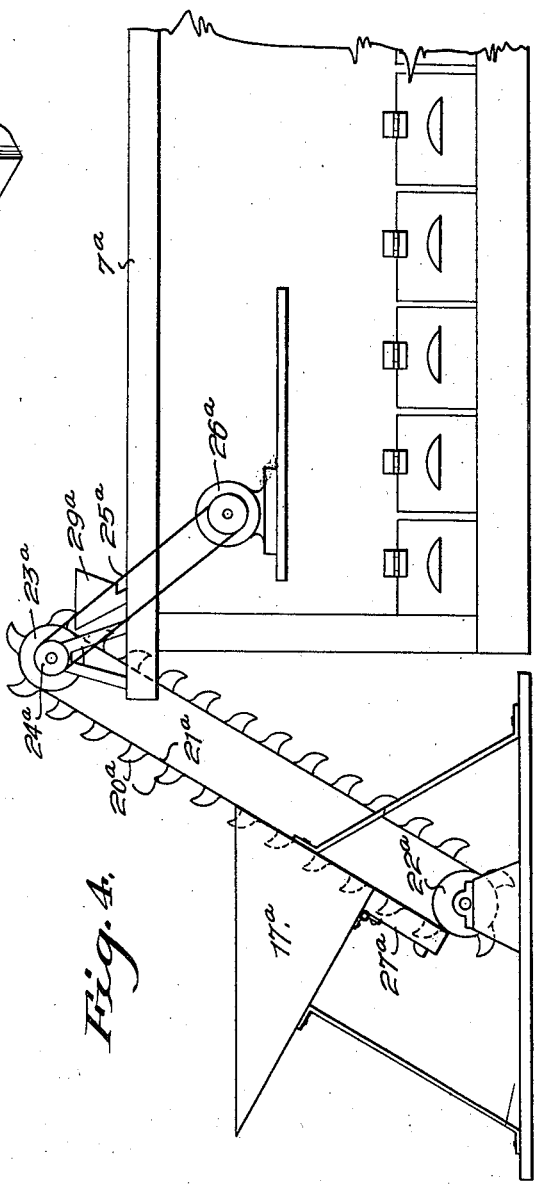
Inventor
William P. Bullard,
By
Attorney Patented July 10, 1923.

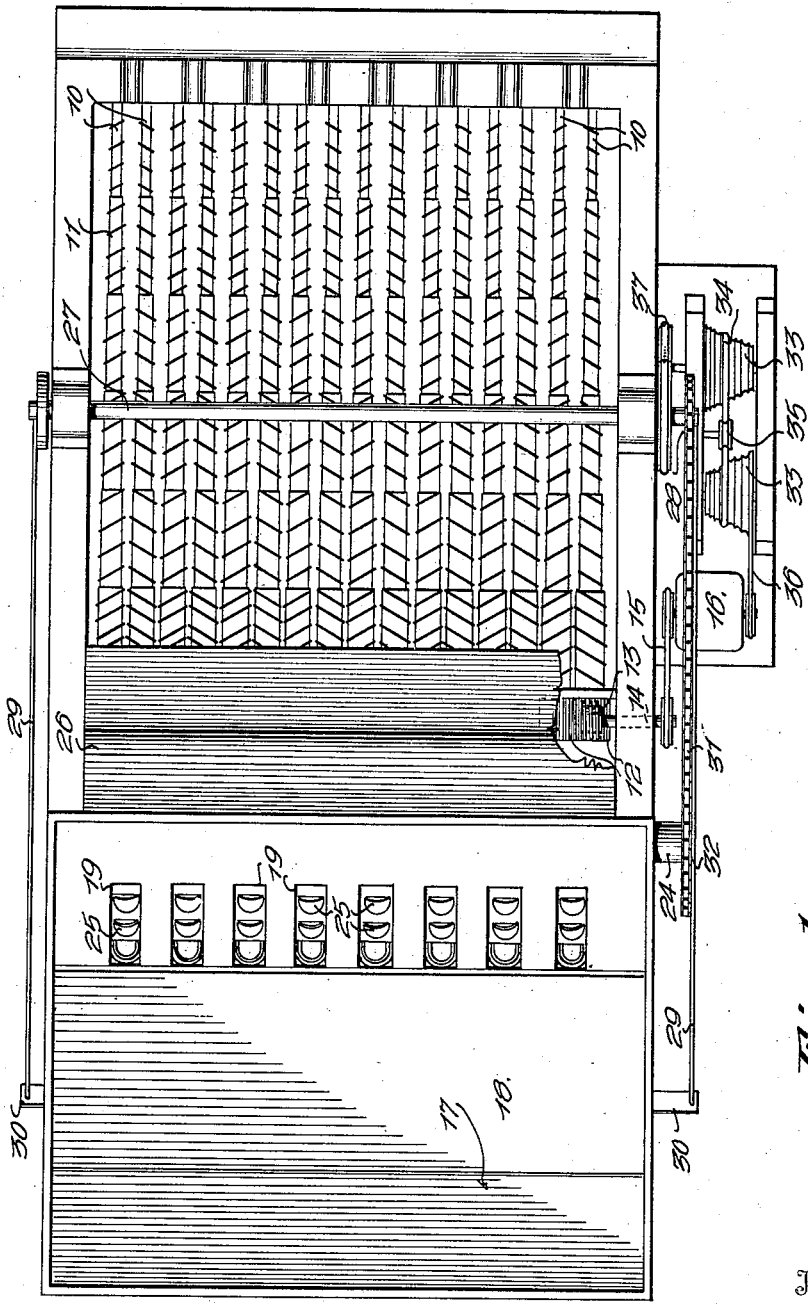

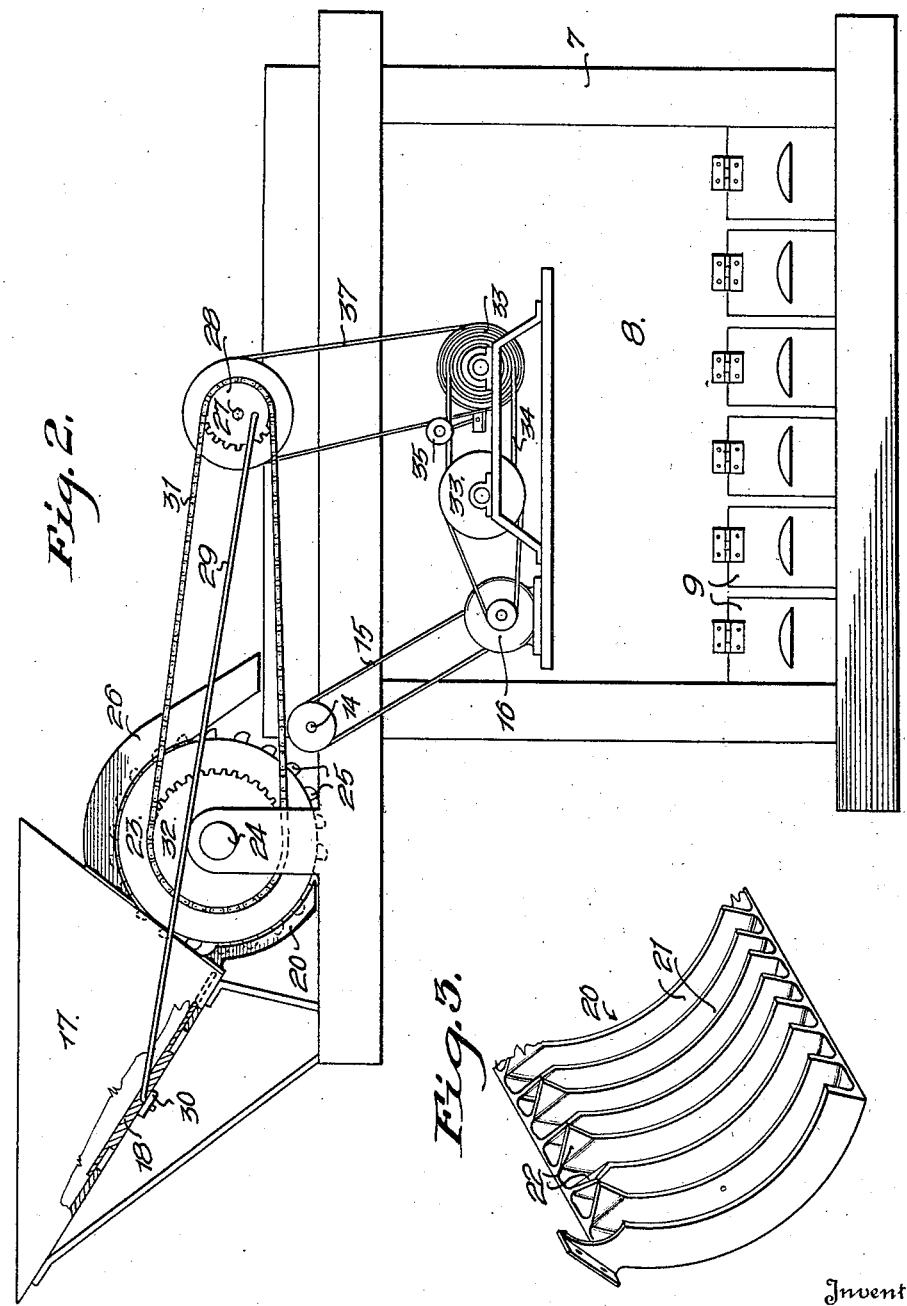

1,461,264

UNITED STATES PATENT OFFICE.

WILLIAM P. BULLARD, OF ALBANY, GEORGIA.

NUT GRADER.

Application filed February 27, 1922. Serial No. 539,530.

*To all whom it may concern:*

Be it known that I, WILLIAM P. BULLARD, a citizen of the United States, residing at Albany, in the county of Dougherty and State of Georgia, have invented certain new and useful Improvements in Nut Graders, of which the following is a specification.

The present invention relates to apparatus for grading nuts and other articles. While particularly useful in the grading of pecan nuts, it is, of course, not limited to that use. It has been difficult to separate pecans into lots of different sizes because of their varying forms, some being long and thin and others relatively short and of great diameter. Moreover it is difficult to mechanically feed a mixed lot of nuts to the grading mechanism, and with pecan nuts especially they will often interfit in such a manner that they will produce an arch, so that their delivery is prevented. These difficulties are overcome in the present invention.

In the accompanying drawings:—

Figure 1 is a plan view of one embodiment thereof,

Figure 2 is a side elevation of the same,

Figure 3 is a detail perspective view of the channel spout of the hopper,

Figure 4 is a side elevation of a modified form of feeding mechanism,

Figure 5 is a plan view of a portion of the same,

Figure 6 is a detail perspective view of the channel spout of the hopper structure shown in Figure 4.

Referring to the embodiment illustrated in Figures 1, 2 and 3, a suitable supporting frame 7 is employed enclosing a container 8 for the graded nuts, and having compartments to which access is gained through doors 9. Journaled longitudinally in the top of the frame over the container 8 are pairs of grading rolls 10, each roll having portions of successively decreased diameter, as will be clear by reference to Figure 1. Each of these rolls moreover is provided with a screw rib 11 formed in any suitable manner, the ribs of coacting companion rolls being inclined in opposite directions. These rolls are provided at their larger ends with intermeshing gears 12, whereby the coacting rolls of each set are simultaneously rotated in opposite directions. The gear of one of the end rolls is in mesh with a worm 13 carried by a drive shaft 14 suitably journaled in the frame, and this shaft is belted, as shown at 15 to a suitable motor 16.

Mounted upon one end of the frame 7 is a nut-receiving hopper 17, the rear inclined wall of which includes a reciprocatory plate 18, forming an agitator. The opposite side has open slots 19, and depending from this open portion is a curved spout 20 formed into a series of channels 21, the upper ends of which are preferably flared, as shown at 22. A feeding drum 23, journaled as illustrated at 24, on the frame 7, is provided with a plurality of annular series of cups 25 that project therefrom and operate respectively in the different channels 21 and through the slots 19. The arrangement is such that at least two of the cups are simultaneously in each of the channels 21. The drum is intended to be rotated so that the cups will pass upwardly through the channels 22 and slots 19 and these cups discharge between the larger ends of each set of coacting rolls. A hood 26 is located over the drum and its outer end preferably is spaced therefrom, as clearly shown in Figure 2.

Journaled transversely over the rolls is a crank shaft 27, on the ends of which are located crank wheels 28, and pitmen 29 engaged with said wheels are connected to ears 30 on the agitator plate 18. One of these crank disks 28 is in the form of a sprocket wheel, and passing around the same is a sprocket chain 31 that passes around a gear wheel 32 fixed to the drum. A change-speed gearing is interposed between the motor 16 and the crank shaft 27. This change-speed gearing is preferably in the form of oppositely disposed cone pulleys 33 connected by a belt 34, which belt is maintained taut by a suitable tightening device 35. One of these cone pulleys 33 is geared, as shown at 36 to the motor and the other is belted, as shown at 37 to the crank shaft 27.

With this construction, when the pecans or other nuts are introduced into the hopper 17 and the motor is in operation they will gravitate toward the slots 19 and channels 21. They will therefore be successively picked up by the upwardly rotating cups and delivered on to the grading rolls. As these rolls are rotated obviously the nuts will be carried down until the space between the rolls is sufficient to permit them to thus drop through, the different sizes being collected through the doorways 9.

The agitator 18 in connection with the cups effectively prevents the lodging of the nuts and their arching in the hopper.

A modified form of construction is illustrated in Figures 4 and 5 and 6. In this embodiment the frame carrying the grading rolls is designated $7^a$, and the hopper is illustrated at $17^a$. It is provided with a series of slots $19^a$, through which pass cups $20^a$ carried by a plurality of endless belts $21^a$. These belts pass around lower pulleys $22^a$ and upper pulleys $23^a$. The pulleys $23^a$ are mounted on a shaft $24^a$ that is driven as illustrated at $25^a$ from a motor $26^a$. The hopper is provided with depending channel spouts $27^a$ grooved as shown at $28^a$ and resting on the belts. Through the grooves the cups pass. The cups on each of the belts deliver to a suitable hopper $29^a$ that direct the nuts delivered to the grading rolls as shown at $30^a$.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In nut feeding means, a hopper having a side wall with openings therein and an opposite movable wall, means moving adjacent said openings and carrying nuts therefrom to points outside the hopper, and means for simultaneously operating said nut-carrying means and the movable wall.

2. In nut feeding means, a hopper having a side with openings therein and an opposite movable agitator, nut-receiving cups mounted to move upwardly and project through said openings in their passage to carry the nuts upwardly out of the hopper and means for moving said cups and said agitator.

3. In nut feeding means, a hopper having a plurality of channels extending downwardly therefrom, and means for carrying nuts from the hopper including a plurality of nut holding cups that pass successively through the channels.

4. In nut feeding means, a hopper having a plurality of channels extending downwardly therefrom, means for carrying nuts from the hopper including a plurality of nut holding cups that pass successively through said channels, an agitator in the hopper, and means for actuating the agitator.

5. In nut feeding means, a hopper having a rear movable agitating wall and a front side provided with openings, a plurality of depending channels communicating with said openings, a rotary drum having projecting nut carrying devices that operate through said channels and said openings, and means for rotating the drum and moving the agitating wall.

In testimony whereof, I affix my signature in the presence of two witnesses.

WILLIAM P. BULLARD.

Witnesses:
Wm. Baldwin,
Y. H. McCalla.